United States Patent
Hamaguchi (10) Patent No.: US 10,290,286 B2
(45) Date of Patent: May 14, 2019

(54) DISPLAY CONTROLLER FOR CONTROLLING TWO DISPLAYS AND PROGRAM FOR THE DISPLAY CONTROLLER

(71) Applicant: DENSO CORPORATION, Kariya, Aichi-pref. (JP)

(72) Inventor: Kenichi Hamaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 7 days.

(21) Appl. No.: 15/316,239

(22) PCT Filed: Jun. 3, 2015

(86) PCT No.: PCT/JP2015/002804
§ 371 (c)(1),
(2) Date: Dec. 5, 2016

(87) PCT Pub. No.: WO2015/194111
PCT Pub. Date: Dec. 23, 2015

(65) Prior Publication Data
US 2017/0154608 A1    Jun. 1, 2017

(30) Foreign Application Priority Data
Jun. 18, 2014   (JP) .................................. 2014-125519

(51) Int. Cl.
*G09G 5/14* (2006.01)
*G01C 21/36* (2006.01)
(Continued)

(52) U.S. Cl.
CPC ............... *G09G 5/14* (2013.01); *B60K 35/00* (2013.01); *G01C 21/36* (2013.01);
(Continued)

(58) Field of Classification Search
CPC .................................. G06F 3/14; G09G 5/363
(Continued)

(56) References Cited

U.S. PATENT DOCUMENTS

2010/0257465 A1* 10/2010 Yajima ................... G06F 3/1454
715/759
2011/0242361 A1* 10/2011 Kuwahara ............... A63F 13/10
348/231.4
(Continued)

FOREIGN PATENT DOCUMENTS

JP       2011007701 A    1/2011
WO    WO-2015068368 A1  5/2015

*Primary Examiner* — Jin Ge
(74) *Attorney, Agent, or Firm* — Harness, Dickey & Pierce, P.L.C.

(57) ABSTRACT

A display controller for controlling a first display and a second display is provided. The display controller includes a determination unit and a display control unit. From a memory, the determination unit reads a screen grouping data classifying a plurality of display screens into groups on a function basis, and determines whether a specific screen transition request, which is a request that a screen belonging to the same group as a screen displayed on one display of the first and the second displays be displayed on the other display of the first and the second displays is issued. Based on determining that the specific screen transition request is issued, the display control unit displays on the one display of the first and second displays a screen other than the screen belonging to the same group.

14 Claims, 6 Drawing Sheets

(51) Int. Cl.
*G06F 3/14* (2006.01)
*G09G 5/00* (2006.01)
*B60K 35/00* (2006.01)
*G06F 3/041* (2006.01)

(52) U.S. Cl.
CPC .......... *G01C 21/3664* (2013.01); *G06F 3/14* (2013.01); *G06F 3/1423* (2013.01); *G09G 5/00* (2013.01); *B60K 2350/1028* (2013.01); *B60K 2350/1056* (2013.01); *B60K 2350/352* (2013.01); *G06F 3/0416* (2013.01); *G09G 2360/04* (2013.01); *G09G 2380/10* (2013.01)

(58) Field of Classification Search
USPC ........................................................ 345/520
See application file for complete search history.

(56) References Cited

U.S. PATENT DOCUMENTS

| | | | |
|---|---|---|---|
| 2012/0044170 A1* | 2/2012 | Homma | G06F 3/0488 345/173 |
| 2012/0101722 A1 | 4/2012 | Inami et al. | |
| 2013/0215332 A1* | 8/2013 | Matsumoto | H04N 21/41422 348/738 |
| 2014/0375447 A1* | 12/2014 | Raghunathan | H04L 67/10 340/462 |
| 2015/0151689 A1* | 6/2015 | Kimura | G06F 3/14 348/118 |
| 2016/0280068 A1 | 9/2016 | Oku et al. | |

* cited by examiner

DISPLAY CONTROLLER FOR CONTROLLING TWO DISPLAYS AND PROGRAM FOR THE DISPLAY CONTROLLER

CROSS REFERENCE TO RELATED APPLICATIONS

This application is a U.S. National Phase Application under 35 U.S.C. 371 of International Application No. PCT/JP2015/002804 filed on Jun. 3, 2015 and published in Japanese as WO 2015/194111 A1 on Dec. 23, 2015. This application is based on and claims the benefit of priority from Japanese Patent Application No. 2014-125519 filed on Jun. 18, 2014. The entire disclosures of all of the above applications are incorporated herein by reference.

TECHNICAL FIELD

The present disclosure relates to a display controller for controlling two displays and a program for the display controller.

BACKGROUND ART

Hitherto, a display controller for controlling two displays is known (for example, refer to Patent Literature 1).

PRIOR ART LITERATURES

Patent Literature

Patent Literature 1: JP2011-7701A

SUMMARY OF INVENTION

Studies by the inventor of the present invention has revealed that the following problems are involved in such a display controller. Supposed that when a first display is displaying a screen associated with a certain function (for example, function of a hands-free telephone call) and a second display is also displaying a screen associated with the same function, a user changes the operating state of the function by utilizing the second display. In such a case, the displayed content of the first display may become inconsistent with the actual state of the function concerned.

For example, suppose that when the first display is displaying a screen for inputting a calling destination telephone number of the hands-free telephone call and the second display is displaying an outgoing and incoming call history screen of the hands-free telephone call, the user selects one call partner on the outgoing and incoming call history screen as a calling destination. As a result, an outgoing call to the call partner is transmitted and a telephone call with the call partner is performed; accordingly, the screen for inputting the calling destination telephone number of the first display will become meaningless.

In view of the above, it is an object of the present disclosure to prevent, in a technology for controlling two displays, an occurrence of inconsistency in cases where screens associated with a certain function are displayed on both of the displays and a user changes an operating state of the function by utilizing one of the displays.

In a first aspect of the present disclosure, there is provided a display controller for controlling a first display and a second display, the display controller comprising: a determination unit that reads a screen grouping data classifying a plurality of display screens into groups on a function basis from a memory, and determines based on the screen grouping data whether a specific screen transition request is issued, wherein the specific screen transition request is a request that a screen belonging to the same group as a screen displayed on one display of the first and second displays be displayed on the other display of the first and second displays; and a display control unit that displays on the one display of the first and second displays a screen other than the screen belonging to the same group based on determining that the specific screen transition request is issued.

Accordingly, by utilizing the screen grouping data grouping the polarity of display screens on the function-basis in this way, it becomes possible to easily determine whether the screen transition request to display a screen of the same function on two displays is issued. Further, by displaying a screen other than the screen of the function on the one display based on the issued screen transition request, it becomes possible to prevent the screen associated with the same function from being displayed on both displays. Consequently, inconsistency arising from the result that the user has changed the operating state of the function by using the one display is prevented.

In a second aspect of the present disclosure, there is provided a program for display controller for controlling a first display and a second display, the program causing the display controller to function as: a determination unit that reads a screen grouping data classifying a plurality of display screens into groups on a function basis from a memory, and determines based on the screen grouping data whether a specific screen transition request is issued, wherein the specific screen transition request is a request that a screen belonging to the same group as a screen displayed on one of the first display and the second display be displayed on the other of the first display and the second display; and a display control unit that displays on the one display of the first display and the second display a screen other than the screen belonging to the same group based on determining that the specific screen transition request is issued. With such a program employed, it becomes possible to produce the same effect as in the display controller.

BRIEF DESCRIPTION OF THE DRAWINGS

The above and other objects, features and advantages of the present disclosure will become more apparent from the detailed description given hereinafter with reference to the accompanying drawings, wherein.

EMBODIMENTS FOR CARRYING OUT INVENTION

Figure 1:
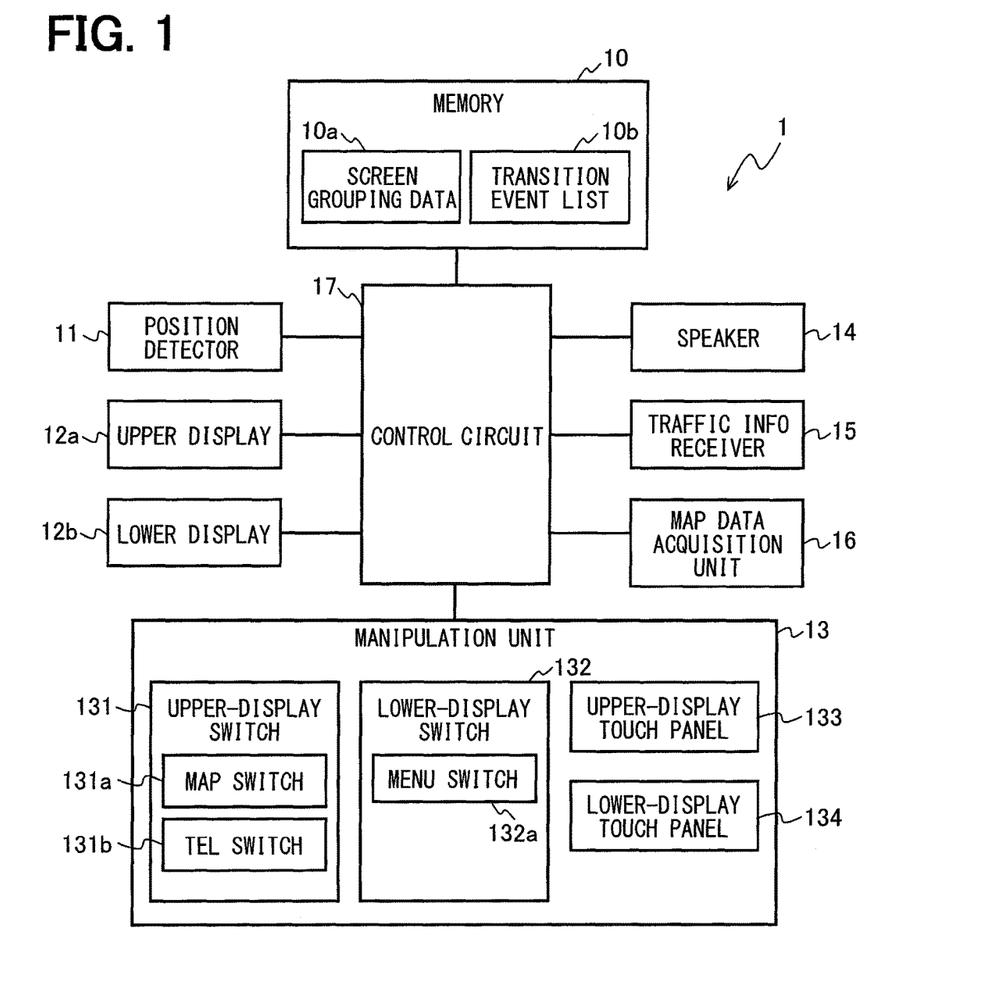
FIG. 1 is a configuration diagram illustrating a vehicle navigation device according to an embodiment.

Hereinafter, one embodiment is explained. As illustrated in FIG. 1, a vehicle navigation device 1 of the present embodiment is mounted in a vehicle and includes a memory 10, a position detector 11, an upper display 12a, a lower display 12b, a manipulation unit 13, a speaker 14, a traffic information receiver 15, a map data acquisition unit 16, and a control circuit 17.

The memory 10 is a nonvolatile memory (for example, a flash memory and an ROM) in which the data such as screen grouping data 10a and a transition event list 10b are stored in advance before the factory shipments of the vehicle navigation device 1. The screen grouping data 10a and the transition event list 10b will be described later.

The position detector 11 is a sensor that outputs a signal for locating the current position of the vehicle to the control circuit 17. The position detector 11 is a GPS receiver, a vehicle speed sensor, an acceleration sensor, a gyro sensor, etc.

Each of the upper display 12a (corresponding to an example of a first display) and the lower display 12b (corresponding to an example of a second display) is an image display device, such as a liquid crystal display, and displays a character and a picture to a driver under the control of the control circuit 17. The upper display 12a and the lower display 12b are the image display devices provided separately and are arranged up and down collaterally in the central part of the dashboard of the vehicle, for example. More specifically, the upper display 12a is arranged on the upper side of the lower display 12b.

The manipulation unit 13 is a device that receives operation of a driver and outputs a signal corresponding to the received operation to the control circuit 17. The manipulation unit 13 of the present embodiment includes an upper-display switch 131, a lower-display switch 132, an upper-display touch panel 133, and a lower-display touch panel 134.

The upper-display switch 131 is a mechanical switch group for controlling the displayed content of the upper display 12a, and includes such mechanical switches as a MAP switch 131a and a TEL switch 131b. The lower-display switch 132 is a mechanical switch group for controlling the displayed content of the lower display 12b, and includes such a mechanical switch as a MENU switch 132a.

The upper-display touch panel 133 is arranged on the display screen of the upper display 12a, and detects operations (such as touch, pinch, and flick) of an occupant to the picture displayed on the display screen of the upper display 12a. The lower-display touch panel 134 is arranged on the display screen of the lower display 12b, and detects operations (such as touch, pinch, and flick) of the occupant to the picture displayed on the display screen of the lower display 12b.

The audio output device 14 outputs speeches toward the occupant such as the driver in the vehicle. The map data acquisition unit 16 is a device that acquires map data according to the control of the control circuit 17 and outputs it to the control circuit 17. The traffic information receiver 15 acquires traffic information from the outside of the vehicle by wireless communications and may employ a VICS receiver (VICS is a registered trademark), for example.

The control circuit 17 (corresponding to an example of a display controller) is a device (for example, a microcomputer) with a CPU, an RAM, an ROM, and a flash memory. The CPU executing a program stored in the ROM or the flash memory can realize various kinds of function.

The function realized by the control circuit 17 executing the program includes basic function, map display function, navigation function, hands-free function, audio function, and air-conditioning control function.

The basic function performs various setups of the home screen display and the vehicle navigation device 1. The map display function displays a map on the upper display 12a. The navigation function sets up a destination and guides a route to the set-up destination. The hands-free function realizes a hands-free telephone call via a mobile phone carried by the occupant in the vehicle in communications with the mobile phone. The audio function chooses a musical piece to reproduce and reproduces the selected musical piece. The air-conditioning control function controls the air conditioner of the vehicle.

Figure 2:
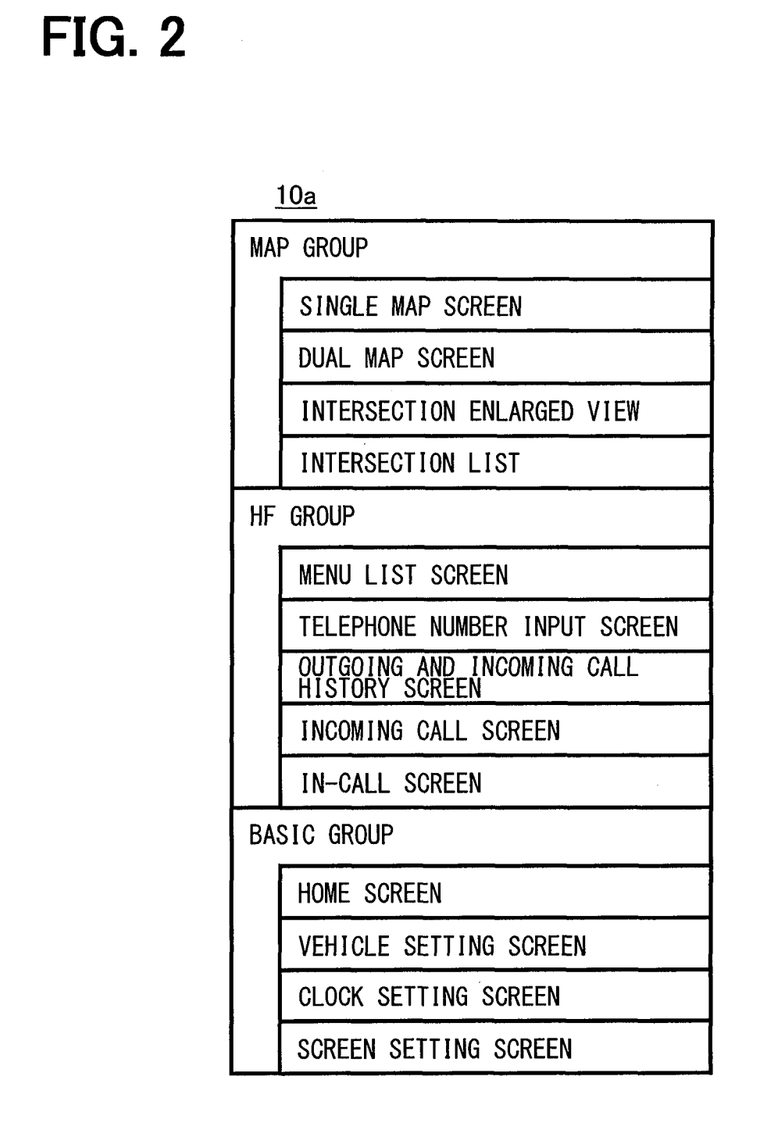
FIG. 2 is a drawing illustrating an example of screen grouping data.

In the above-described screen grouping data 10a, the multiple display screens are classified into groups on an above-described function basis. The display screens include a screen to be displayed on both of the displays 12a and 12b and a screen to be displayed only on either one of the displays 12a and 12b.

For example, as illustrated in FIG. 2, the basic group as a group of the basic function includes a home screen, a vehicle-setting screen, a clock-setting screen, and a screen-setting screen. The home screen displays an icon group of the uppermost hierarchy of the basic function. This icon group includes, for example, a setting icon which, upon selected, causes display processing of the icon group for various setup, and an information icon which, upon selected, causes display processing of various information on the vehicle. The vehicle-setting screen is a screen for inputting a setup of an auto light, a wiper, an auto lock, and a direction indicator. The clock-setting screen sets up the time of the clock. The screen-setting screen sets up the brightness, contrast, black level, etc. of the screen.

The map group as a group of the map display function includes a single map screen, a dual map screen, an intersection enlarged view, and the well-known screen of an intersection list.

The HF group as a group of the hands-free function includes a menu list screen, a telephone number input screen, an outgoing and incoming call history screen, an incoming call screen, and an in-call screen. The menu list screen displays an icon group of the uppermost hierarchy of the hands-free function. The telephone number input screen is a screen for inputting the telephone number for an outgoing call. The outgoing and incoming call history screen displays the history of the outgoing and incoming calls. The incoming call screen displays a sending source, when there is the arrival of an incoming call. The in-call screen displays a call partner and call duration during the telephone call.

Although not illustrated in the drawings, the navigation group as a group of the navigation function includes multiple screens for the destination setting. The audio device group as a group of the audio function includes multiple screens for selecting musical pieces. The air-conditioning group as a group of the air-conditioning function includes multiple screens for adjusting the air-conditioning.

When explained more concretely from a viewpoint of a data structure, the screen grouping data 10a describes the many-to-one relationship of the screen ID and the group ID. The screen ID is the identifier assigned for every display screen. The group ID is the identifier assigned for every group. Specifically, for every group ID, the list of the screen IDs corresponding to the group ID is described.

The following explains the transitions of the screen display on the upper display 12a and the lower display 12b of the vehicle navigation device 1, with reference to FIG. 3 to FIG. 7.

Figure 3:
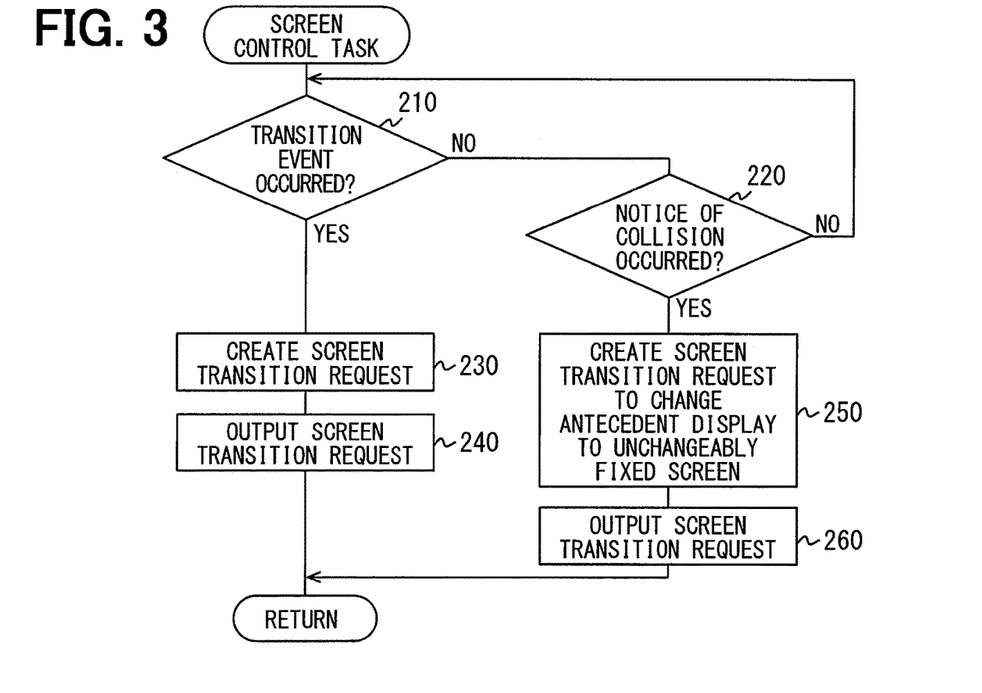
FIG. 3 is a flow chart illustrating processing of a screen control task.
Figure 4:
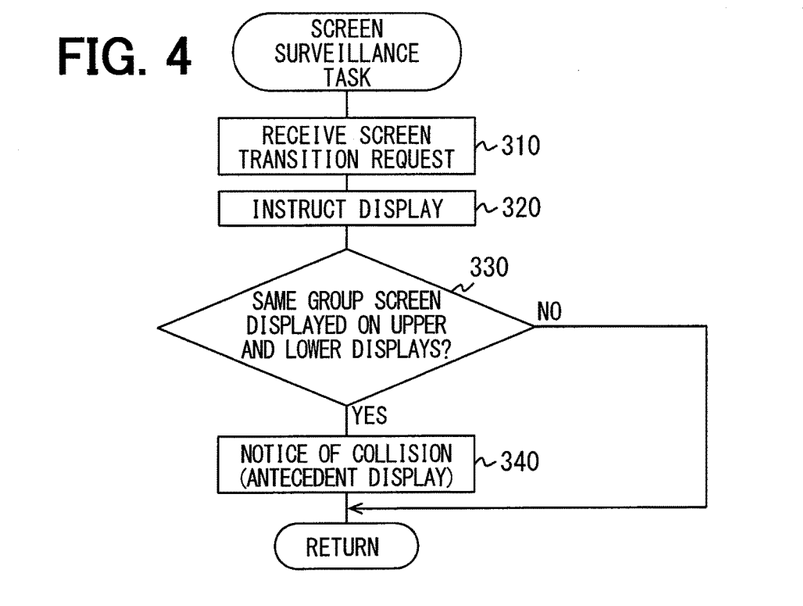
FIG. 4 is a flow chart illustrating processing of a screen surveillance task.

In addition to the processing for the various kinds of function described above, the control circuit 17 performs the screen control task illustrated in FIG. 3 and the screen surveillance task illustrated in FIG. 4, by executing the predetermined program stored in the ROM. The control circuit 17 performs the screen control task and the screen surveillance task, concurrently with the processing for the various kinds of function described above, when the main power supply (for example, an IG) of the vehicle is ON.

Figure 5:
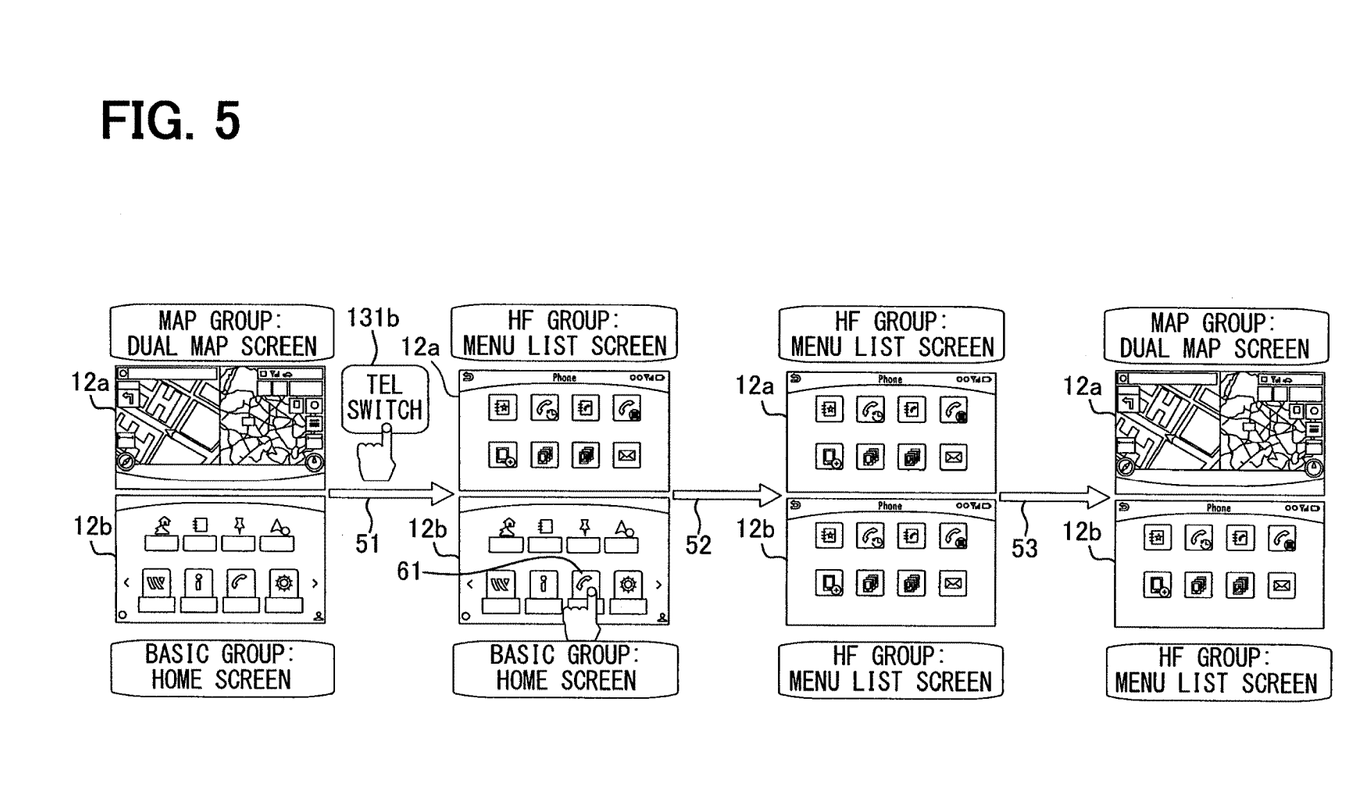
FIG. 5 is a drawing illustrating an example of the screen transition.

The example illustrated in FIG. 5 assumes that the upper display 12a displays the dual map screen included in the map group and the lower display 12b displays the home screen included in the basic group. These screens are displayed on the respective displays, as a result of the display instruction performed by the control circuit 17 at Step 320 of the later-described screen surveillance task. Therefore, the control circuit 17 holds the information concerning on which display the screen of which screen ID is displayed.

During the execution of the screen control task, the control circuit 17 determines whether the transition event has occurred at Step 210. When the transition event has not occurred, the control circuit 17 determines whether the notice of collision has been received at Step 220. When the notice of collision has not been received, the flow returns to Step 210. Accordingly, while no transition event occurs and no notice of collision is received, Steps 210 and 220 are repeated.

Here, the transition event is such an event as acting as a trigger for changing the displayed content in the upper display 12a or the lower display 12b. For example, the event that the occupant performs an operation to change the displayed content on the manipulation unit 13 (for example, the operation of the MAP switch 131a, the TEL switch 131b, and the MENU switch 132a) is an example of the transition event. In addition, there is a transition event unrelated to the operation by the occupant. Based on the transition event list 10b, it is possible to determine what kind of event is the transition event.

The transition event list 10b has multiple records, and each record corresponds to one transition event. Each record includes the event matching with the corresponding transition event, a display ID of a single control target display, and a screen ID of a single transition-destination screen.

Here, the event matching with the transition event is, for example, such an event that, to select the telephone button, the operation of selecting the telephone button is made on the lower-display touch panel 134 on which the MAP switch 131a has been operated. The display ID of the control target display is, among the upper display 12a and the lower display 12b, the display ID of the display in which the screen makes a transition to anther screen due to the transition event (that is, the control target display). The screen ID of the transition-destination screen is the screen ID of the screen to which the display screen of the control target display makes a transition due to the transition event concerned.

For example, one record in the transition event list 10b includes the event of operating the MAP switch 131a, the display ID of the upper display 12a, and the screen ID of the dual map screen. According to this record, when the user operates the MAP switch 131a, the displayed content of the upper display 12a will make a transition to the dual map screen.

Another record in the transition event list 10b includes the event of operating the MENU switch 132a, the display ID of the lower display 12b, and the screen ID of the home screen. According to this record, when the user operates the MENU switch 132a, the displayed content of the lower display 12b will make a transition to the home screen.

The control circuit 17 determines whether the transition event has occurred according to whether the detected event is included in any one of the records in the transition event list 10b. When it is determined that the transition event has occurred at Step 210 of the screen control task, the flow advances to Step 230. In the example illustrated in FIG. 5, the user operates the TEL switch 131b, and the control circuit 17 detects this operation. Then, based on that the record that includes the event matching with this detected operation exists in the transition event list 10b, the control circuit 17 determines that the transition event has occurred at Step 210, and advances to Step 230.

A screen transition request is created at Step 230. The screen transition request is provided with data that includes the display ID of the control target display, and the screen ID of the screen of the transition-destination of the control target display concerned. More specifically, the control circuit 17 reads the display ID of the control target display and the screen ID of the screen of the transition-destination from the record in the transition event list 10b including the event matching with the detected operation, and creates the screen transition request that includes them.

In the example illustrated in FIG. 5, the control circuit 17 extracts a record including the event of the operation of the TEL switch 131b from the transition event list 10b. This record includes the display ID of the upper display 12a, as the display ID of the control target display, and further includes the screen ID of the menu list screen included in the HF group, as the screen ID of the screen of the transition-destination.

Accordingly, in the example illustrated in FIG. 5, the control circuit 17 incorporates the display ID of the upper display 12a into the screen transition request as the display ID of the control target display, and incorporates the screen ID of the menu list screen included in the HF group into the screen transition request. Accordingly, the screen transition request acts as the data that requests the upper display 12a to display the menu list screen included in the HF group.

The menu list screen included in the HF group is a screen that displays the icon group of the uppermost hierarchy of the hands-free function. The user can select any icons belonging to this icon group, by means of the touch panel (by means of the upper-display touch panel 133 when the icons are displayed on the upper display 12a, and by means of the lower-display touch panel 134 when the icons are displayed on the lower display 12b). This icon group includes, for example, the connection icon which, upon selected, causes the processing to connect to a mobile phone, the connection icon which, upon selected, causes the display processing of the outgoing and incoming call history, and the dial icon which, upon selected, causes the display processing of the screen to enable the manual input of the telephone number.

Next, at Step 240, the screen transition request created at Step 230 is outputted to the screen surveillance task. Specifically, the screen transition request is written in the request delivery area in the RAM of the control circuit 17. After Step 240, the flow returns to the loop of Steps 210 and 220.

In the execution of the screen surveillance task, the control circuit 17 stands by at Step 310 until it receives the screen transition request, that is, until the screen transition request is newly written in the screen transition request in the request delivery area. Then, when the screen transition request is received, the flow advances to Step 320.

At Step 320, the display instruction is made. Specifically, the display ID of the control target display and the screen ID of the screen of the transition-destination are read from the screen transition request newly written in the request delivery area, and the display screen of the control target display corresponding to the read display ID makes a transition to the screen matching with the read screen ID.

Accordingly, in the example illustrated in FIG. 5, as indicated by the arrow 51, the display screen of the upper display 12a makes a transition from the display of the dual map screen to the menu list screen of the HF group. The display screen of the lower display 12b does not change at this time.

Next, at Step 330, it is determined whether the upper display 12a and the lower display 12b are displaying screens that belong to the same group. Specifically, first, the screen ID of the screen currently displayed on the upper display 12a and the screen ID of the screen currently displayed on the lower display 12b are specified. Then, the screen grouping data 10a is read, and the group ID corresponding to each of two specified screen IDs is specified, based on the correspondence relation described in the screen grouping data 10a concerned. Then, when the two specified group IDs are the same, it is determined that the upper display 12a and the lower display 12b are displaying the screens that belong to the same group. When the two specified group IDs are not the same, it is determined that the upper display 12a and the lower display 12b are not displaying the screens that belong to the same group. When it is determined that the upper display 12a and the lower display 12b are displaying the screens that belong to the same group, the flow advances to Step 340, and when it is determined otherwise, the flow bypasses Step 340 and returns to Step 310.

The determination at Step 330 is regarded as a determination of whether a specific screen transition request is issued, wherein the specific screen transition request is a request that the screen belonging to the same group as the screen displayed on one of the upper display 12a and the lower display 12b be displayed on the other display.

In the example illustrated in FIG. 5, the display screens of the upper display 12a and the lower display 12b after the transition indicated by the arrow 51 are the menu list screen of the HF group and the home screen of the basic group. In the screen grouping data 10a, the screen ID of the menu list screen is associated with the group ID of the HF group, and the screen ID of the home screen is associated with the group ID of the basic group. Accordingly, based on the screen grouping data 10a, the control circuit 17 determines that the upper display 12a and the lower display 12b are not displaying the screens that belong to the same group and the control circuit 17 bypasses Step 340 and returns to Step 310. Accordingly, the display screens of the upper display 12a and the lower display 12b remain as they are, until another transition event occurs subsequently.

In the example illustrated in FIG. 5, the occupant then operates the telephone icon 61 among the icons displayed on the home screen of the lower display 12b, by means of the lower-display touch panel 134. Then, the control circuit 17 detects this operation, and at Step 210 of the screen control task, the control circuit 17 determines that the transition event has occurred based on that the record including the event matching with this detected operation exists in the transition event list 10b, and advances to Step 230.

Furthermore, in the example illustrated in FIG. 5, at Step 230, the record including the event of the operation of the telephone icon 61 by means of the lower-display touch panel 134 is extracted from the transition event list 10b. This record includes the display ID of the lower display 12b as the display ID of the control target display, and the screen ID of the menu list screen included in the HF group as the screen ID of the screen of the transition-destination. Accordingly, the control circuit 17 incorporates the display ID of the lower display 12b into the screen transition request as the display ID of the control target display, and incorporates the screen ID of the menu list screen included in the HF group into the screen transition request. Accordingly, the screen transition request acts as the data that requests the lower display 12b to display the menu list screen included in the HF group. Next, at Step 240, the screen transition request created at Step 230 is outputted to the screen surveillance task, and the flow returns to the loop of Steps 210 and 220.

Then, the control circuit 17 receives the screen transition request at Step 310 of the screen surveillance task, advances to Step 320, and performs the display instruction in the manner as already explained. Accordingly, in the example illustrated in FIG. 5, as indicated by the arrow 52, the display screen of the lower display 12b makes a transition from the display of the home screen to the menu list screen of the HF group. The display screen of the upper display 12a does not change at this time.

Next, at Step 330, it is determined whether the upper display 12a and the lower display 12b are displaying the screens belonging to the same group, in the manner as already explained. In the example illustrated in FIG. 5, both of the display screens of the upper display 12a and the lower display 12b after the transition indicated by the arrow 52 are the menu list screen of the HF group. Accordingly, the control circuit 17 determines that the upper display 12a and the lower display 12b are displaying the screens belonging to the same group, based on the screen grouping data 10a, and advances to Step 340. A reason for making the determination in this way at this point is that the specific screen transition request is issued at Step 250 immediately before, wherein the specific screen transition request is a request that the screen belonging to the same HF group as the screen displayed on the upper display 12a be displayed on the lower display 12b. In this example, the specific screen transition request is the operation of the icon 61 by means of the lower-display touch panel 134.

At Step 340, the control circuit 17 outputs the notice of collision. The notice of collision is data that includes information indicating that the same group has been displayed and that further includes the display ID of the display that earlier started displaying the screen belonging to the same group concerned among the upper display 12a and the lower display 12b displaying the screens belonging to the same group. Herein, the display that earlier started displaying the screen belonging to the same group is called an earlier-displaying display.

In the example illustrated in FIG. 5, before the transition indicated by the arrow 52, the upper display 12a displays the menu list screen of the HF group. Therefore, the display ID of the earlier-displaying display is the display ID of the upper display 12a. Accordingly, the control circuit 17 incorporates the display ID of the upper display 12a into the notice of collision as the display ID of the earlier-displaying display.

The control circuit 17 creates such a notice of collision, and outputs the notice of collision to the screen control task at Step 340. Specifically, the control circuit 17 writes the notice of collision in the notice delivery area in the RAM of the control circuit 17. After Step 340, the flow returns to Step 310.

While executing the loop of Steps 210 and 220 of the screen control task, the control circuit 17 determines the receipt of the notice of collision at Step 220, based on the newly-writing of the notice of collision in the notice delivery area, and advances to Step 250.

At Step 250, the screen transition request is created as is the case at Step 230. However, the display ID included in the screen transition request created here is the display ID of the earlier-displaying display included in the newly-written notice of collision. The screen ID included in the screen transition request created here is a screen ID uniquely and statically predetermined for every earlier-displaying display before the factory shipments of the vehicle navigation device 1.

More specifically, it is uniquely and statically predetermined that when the earlier-displaying display is the upper display 12*a*, the screen ID of the dual map screen belonging to the map group should be included in the screen transition request. It is uniquely and statically predetermined that when the earlier-displaying display is the lower display 12*b*, the screen ID of the home screen belonging to the basic group should be included in the screen transition request.

In the example illustrated in FIG. 5, the earlier-displaying display is the upper display 12*a*; accordingly, the display ID of the upper display 12*a* and the screen ID of the dual map screen belonging to the map group are included in the screen transition request.

In this way, the selection process of the screen of the transition-destination of the earlier-displaying display at the time of occurrence of the notice of collision is simplified by way of uniquely and statically predetermining the screen of the transition-destination of the earlier-displaying display. The uniquely and statically predetermined screens of the transition-destination determined are different for every display. Therefore, it becomes possible to set up the screen of the transition-destination according to the difference in the intended use of both displays.

The reason why the screen of the earlier-displaying display among the upper display 12*a* and the lower display 12*b* makes the transition is because it is considered that a user intention is involved in the screen transition request for the other display than the earlier-displaying display. If the screen of the display is changed just because the notice of collision occurs, irrespective of the fact that the user has caused the screen of the display to make a transition with a certain intention, the user may be puzzled.

Next, at Step 260, the screen transition request created at Step 250 is outputted to the screen surveillance task. Specifically, the screen transition request is written in the request delivery area in the RAM of the control circuit 17. After Step 250, the flow returns to the loop of Steps 210 and 220.

Then, in response to the screen transition request at Step 310 of the screen surveillance task, the control circuit 17 advances to Step 320 and performs the display instruction in the manner as already explained. Accordingly, in the example illustrated in FIG. 5, as indicated by the arrow 53, the display screen of the upper display 12*a* makes a transition from the menu list screen of the HF group to the dual map screen of the map group. At this time, the display screen of the lower display 12*b* does not change but remains as the menu list screen of the HF group; accordingly, the upper display 12*a* and the lower display 12*b* display the screens belonging to different groups.

During a period from the occurrence of the transition 52 of the screen to the occurrence of the transition 53 of the screen as illustrated in FIG. 5, the screen of the same group is displayed on the upper display 12*a* and the lower display 12*b*. However, the length of this period is as short as about one second or less, for example; accordingly, even if the screens of the same group are displayed on the upper display 12*a* and the lower display 12*b*, there is little possibility for the occupant to perform any operation utilizing one of the screens while the state continues. After the transition indicated by the arrow 53, the display screens of the upper display 12*a* and the lower display 12*b* remain the same, until an occurrence of a certain transition event is determined at Step 210.

The above example illustrated in FIG. 5 is an example that the upper display 12*a* acts as the earlier-displaying display and the displayed content of the upper display 12*a* makes a transition to the dual map screen that is uniquely determined and fixed as the transition-destination in advance.

Figure 6:
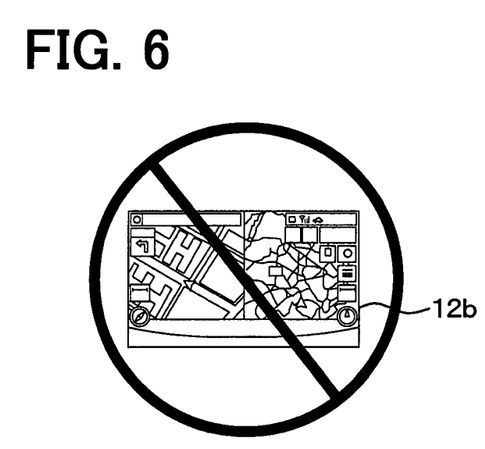
FIG. 6 is a drawing schematically illustrating a screen that cannot be displayed on a lower display.

In the present embodiment, the lower display 12*b* cannot display the screen belonging to the map group, as schematically illustrated in FIG. 6. This is because all the records that include the display ID of the lower display 12*b* as the control target display among the records of the transition event list 10*b* include the screen ID of the screen belonging to groups other than the map group, as the screen ID of the screen of the transition-destination. That is, no matter what transition events occur, the displayed content of the lower display 12*b* cannot make a transition to the screen belonging to the map group. Accordingly, when the upper display 12*a* is displaying the screen belonging to the map group, there is no possibility of occurrence of a certain transition event that triggers the screen transition request which requests that the displayed content of the lower display 12*b* be transition to the screen belonging to the map group.

Figure 7:
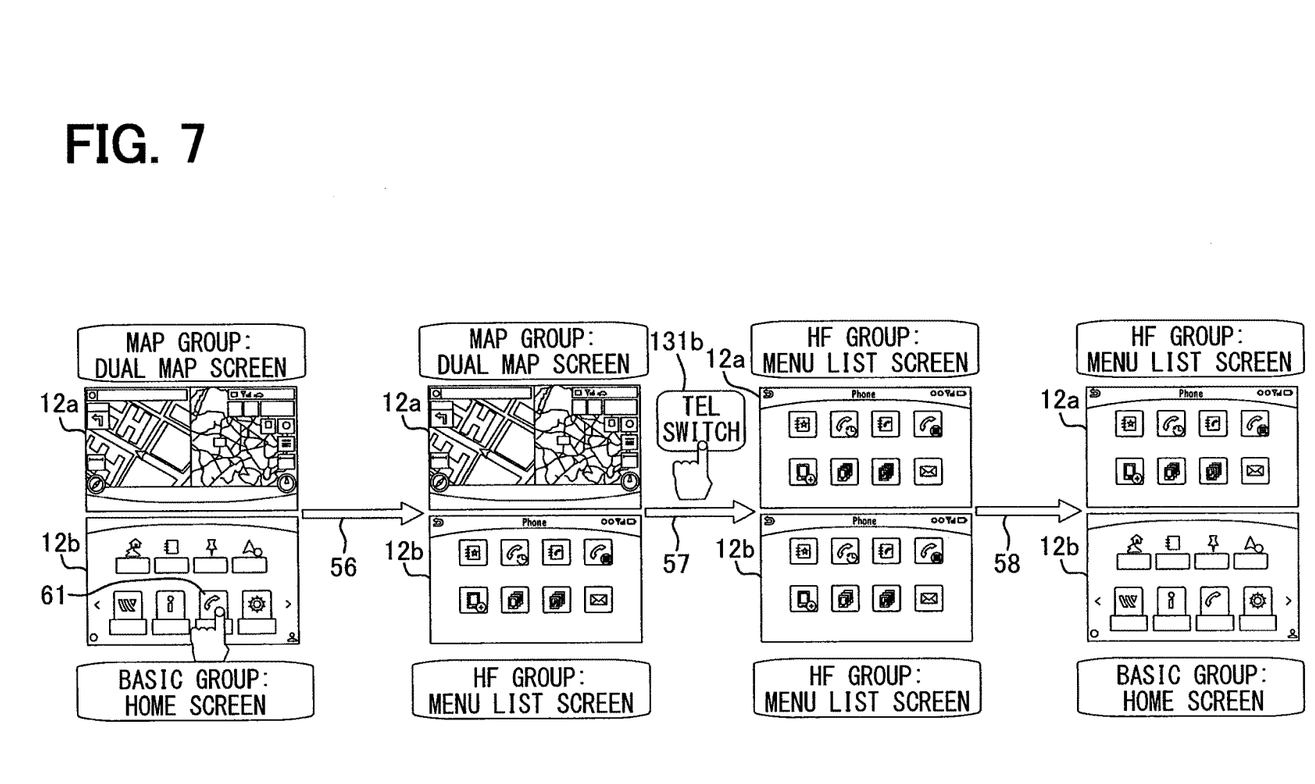
FIG. 7 is a drawing illustrating an example of the screen transition.

Unlike the example illustrated in FIG. 5, there is also an example in which the lower display 12*b* acts as an earlier-displaying display as illustrated in FIG. 7. In the example illustrated in FIG. 7, it is assumed that the upper display 12*a* displays the dual map screen included in the map group, and that the lower display 12*b* displays the home screen included in the basic group. These screens are displayed on the respective displays, as a result of the display instruction performed by the control circuit 17 at Step 320 of the screen surveillance task. Therefore, the control circuit 17 holds the information concerning on which display the screen of which screen ID is displayed.

In the example illustrated in FIG. 7, after this, the occupant operates the telephone icon 61 among the icons displayed on the home screen of the lower display 12*b*, by means of the lower-display touch panel 134. Then, the control circuit 17 detects this operation, and at Step 210 of the screen control task, the control circuit 17 determines occurrence of the transition event based on the presence of the record including the event matching with this detected operation in the transition event list 10*b*, and advances to Step 230.

Furthermore, in the example illustrated in FIG. 7, at Step 230, the control circuit 17 extracts the record including the event of the operation of the telephone icon 61 by means of the lower-display touch panel 134, from the transition event list 10*b*. This record includes the display ID of the lower display 12*b* as the display ID of the control target display, and further includes the screen ID of the menu list screen included in the HF group as the screen ID of the screen of the transition-destination. Accordingly, the control circuit 17 includes the display ID of the lower display 12*b* in the screen transition request as the display ID of the control target display, and includes the screen ID of the menu list screen included in the HF group in the screen transition request. Accordingly, the screen transition request acts as the data that requests the lower display 12*b* to display the menu list screen included in the HF group. Next, at Step 240, the screen transition request created at Step 230 is outputted to the screen surveillance task, and the flow returns to the loop of Steps 210 and 220.

Then, in response to the screen transition request at Step 310 of the screen surveillance task, the control circuit 17 advances to Step 320 and performs the display instruction in the manner as already explained. Accordingly, in the example illustrated in FIG. 7, as indicated by the arrow 56, the display screen of the lower display 12b makes a transition from the display of the home screen to the menu list screen of the HF group. The display screen of the upper display 12a does not change at this time.

Next, at Step 330, it is determined whether the upper display 12a and the lower display 12b are displaying the screens belonging to the same group, in the manner as already explained. In the example illustrated in FIG. 7, the display screens of the upper display 12a and the lower display 12b after the transition indicated by the arrow 56 are the dual map screen and the menu list screen of the HF group. In the screen grouping data 10a, the group ID of the map group corresponds to the screen ID of the dual map screen, and the group ID of the HF group corresponds to the screen ID of the menu list screen. Accordingly, the control circuit 17 determines based on the screen grouping data 10a that the upper display 12a and the lower display 12b are not displaying the screens belonging to the same group, and the control circuit 17 bypasses Step 340 and returns to Step 310. Accordingly, the display screens of the upper display 12a and the lower display 12b remain as they are, until another transition event occurs subsequently.

In the example illustrated in FIG. 7, the occupant operates the TEL switch 131b after this. Then, the control circuit 17 detects this operation, and at Step 210 of the screen control task, the control circuit 17 determines occurrence of the transition event based on the presence of the record including the event matching with this detected operation in the transition event list 10b, and advances to Step 230.

Furthermore, in the example illustrated in FIG. 7, at Step 230, a record including the event of the operation of the TEL switch 131b is extracted from the transition event list 10b. This record includes the display ID of the upper display 12a as the display ID of the control target display, and further includes the screen ID of the menu list screen included in the HF group as the screen ID of the screen of the transition-destination.

Therefore, the control circuit 17 incorporates the display ID of the upper display 12a into the screen transition request as the display ID of the control target display, and incorporates the screen ID of the menu list screen included in the HF group into the screen transition request. Accordingly, the screen transition request acts as the data that requests the upper display 12a to display the menu list screen included in the HF group. Next, at Step 240, the screen transition request created at Step 230 is outputted to the screen surveillance task, and the flow returns to the loop of Steps 210 and 220.

Then, in response to the screen transition request at Step 310 of the screen surveillance task, the control circuit 17 advances to Step 320 and performs the display instruction in the manner as already explained. Accordingly, in the example illustrated in FIG. 7, as indicated by the arrow 57, the display screen of the upper display 12a makes a transition from the display of the dual map screen to the menu list screen of the HF group. The display screen of the lower display 12b does not change at this time.

Next, at Step 330, it is determined whether the upper display 12a and the lower display 12b are displaying the screens belonging to the same group, in the manner as already explained. In the example illustrated in FIG. 7, both of the display screens of the upper display 12a and the lower display 12b after the transition indicated by the arrow 57 are the menu list screen of the HF group. Accordingly, the control circuit 17 determines that the upper display 12a and the lower display 12b are displaying the screens belonging to the same group based on the screen grouping data 10a, and advances to Step 340. A reason for making the determination in this way at this point is because the specific screen transition request is made at Step 250 immediately before, wherein the specific screen transition request is a request that the screen belonging to the same HF group as the screen displayed on the lower display 12b be displayed on the upper display 12a. In this example, the specific screen transition request is issued upon the operation of the TEL switch 131b.

At Step 340, the notice of collision is given and outputted to the screen surveillance task, as already explained. In the example illustrated in FIG. 7, the lower display 12b displays the menu list screen of the HF group before the transition indicated by the arrow 57; therefore, the earlier-displaying display is the lower display 12b. Accordingly, the control circuit 17 incorporates the display ID of the lower display 12b into the notice of collision as the display ID of the earlier-displaying display.

While executing the loop of Steps 210 and 220 of the screen control task, the control circuit 17 determines receipt of the notice of collision at Step 220, based on that the notice of collision is newly written in the notice delivery area, and advances to Step 250.

At Step 250, the screen transition request is created in the manner as already explained. Accordingly, the display ID included in the screen transition request created here is the display ID of the lower display 12b included in the notice of collision newly written. The screen ID included in the screen transition request created here is the screen ID of the home screen belonging to the basic group. As explained already, this is because it is statically and uniquely predetermined that when the earlier-displaying display is the lower display 12b, the screen ID of the home screen belonging to the basic group should be included in the screen transition request.

Next, at Step 260, the screen transition request created at Step 250 is outputted to the screen surveillance task, as already explained. Then, in response to the screen transition request at Step 310 of the screen surveillance task, the control circuit 17 advances to Step 320 and performs the display instruction in the manner as already explained. Accordingly, in the example illustrated in FIG. 7, as indicated by the arrow 58, the display screen of the lower display 12b makes a transition from the menu list screen of the HF group to the home screen of the basic group. At this time, the display screen of the upper display 12a does not change but remains as the menu list screen of the HF group, accordingly, the upper display 12a and the lower display 12b display the screens belonging to different groups.

During a period from the occurrence of the transition 57 of the screen to the occurrence of the transition 58 of the screen as illustrated in FIG. 7, the screens of the same group are displayed on the upper display 12a and the lower display 12b. However, the length of this period is as short as one second or less, for example; accordingly, even if the screens of the same group are displayed on the upper display 12a and the lower display 12b, there is little possibility for the user to perform any operation utilizing one of the screens while the state continues. After the transition indicated by the arrow 58, the display screens of the upper display 12a and the lower display 12b remain the same, until it is determined at Step 210 that a certain transition event has occurred.

The above example illustrated in FIG. 7 is an example in which the lower display 12b acts as an earlier-displaying display and the displayed content of the lower display 12b makes a transition to the home screen that is statically and uniquely predetermined as the transition-destination in advance.

In the present embodiment, the upper display 12a can also display the screen belonging to the basic group. That is, a part of the records that include the display ID of the upper display 12a as the control target display among the records of the transition event list 10b includes the screen ID of the screen belonging to the basic group as the screen ID of the screen of the transition-destination.

Accordingly, in some cases, a transition event may occur during displaying the screen belonging to the basic group on the lower display 12b, and consequently, the control circuit 17 may create the screen transition request to cause the displayed content of the upper display 12a to make a transition to the screen belonging to the basic group at Step 230.

In that case, the control circuit 17 outputs the screen transition request to the screen surveillance task at Step 240. Via Step 310 of the screen surveillance task, the control circuit 17 causes the displayed content of the upper display 12a to make a transition to the screen belonging to the basic group responding to the screen transition request at Step 320. At this moment, both of the upper display 12a and the lower display 12b are displaying the screens belonging to the basic group.

Furthermore, the control circuit 17 determines at Step 330 that the upper display 12a and the lower display 12b are displaying the screens belonging to the same group, and advances to Step 340. Then, at Step 340, the control circuit 17 outputs the notice of collision including the display ID of the lower display 12b as the earlier-displaying display to the screen control task.

Furthermore, upon determining the receipt of this notice of collision at Step 220 of the screen control task, the control circuit 17 advances to Step 250 to create the screen transition request, and outputs this screen transition request to the screen surveillance task at Step 260.

In the above, the screen transition request created at Step 250 is the screen transition request to cause the lower display 12b serving as the earlier-displaying display to make a transition to the home screen of the basic group. Accordingly, through Step 310 of the screen surveillance task and at Step 320, the control circuit 17 causes the displayed content of the lower display 12b to make a transition from the screen belonging to the basic group to the home screen belonging to the same basic group, according to the screen transition request concerned. Accordingly, at this moment, both of the upper display 12a and the lower display 12b are yet in the state of displaying the screens belonging to the basic group.

At this time, the control circuit 17 determines further at Step 330 that the upper display 12a and the lower display 12b are displaying the screens belonging to the same group, according to the processing as already explained, and advances to Step 340. At Step 340, the control circuit 17 outputs the notice of collision to the screen control task. In this regard, the display ID of the earlier-displaying display included in this notice of collision is different from that at Step 340 in the previous time, but is the display ID of the upper display 12b.

Furthermore, upon determining the receipt of this notice of collision at Step 220 of the screen control task, the control circuit 17 advances to Step 250 to create the screen transition request, and outputs this screen transition request to the screen surveillance task at Step 260.

The screen transition request created at Step 250 is the screen transition request to cause the upper display 12a serving as the earlier-displaying display to make a transition to the dual map screen of the map group. Accordingly, through Step 310 of the screen surveillance task and at Step 320, the control circuit 17 causes the displayed content of the upper display 12a to make a transition from the screen belonging to the basic group to the dual map screen belonging to the map group, according to the screen transition request concerned. Accordingly, at this moment, the screens displayed on the upper display 12a and the lower display 12b belong to different groups for the first time.

That is, even if the displayed content of the upper display 12a makes a transition to the screen belonging to the basic group while the lower display 12b is displaying the screen belonging to the basic group, the screens displayed on the upper display 12a and the lower display 12b belong to different groups eventually.

As explained above, the vehicle navigation device 1 of the present embodiment: reads the screen grouping data 10a from the memory 10; based on the screen grouping data, determines whether the specific screen transition request is issued, which requests that a screen belonging to the same group as a screen displayed on one display of the upper display 12a and the lower display 12b be displayed on the other display (Step 320); and, based on the issue of the specific screen transition request, causes the display screen to make a transition such that a screen other than the screen belonging to the same group is displayed on one display of the upper display 12a and the lower display 12b (Steps 250 and 260).

In this way, by utilizing the screen grouping data grouping multiple display screens on a their-functions basis, it is possible to determine easily whether the screen transition request to display screens of the same function on two displays 12a and 12b is issued. Accordingly, the screens associated with the same function are prevented from being displayed on both displays, by displaying a screen other than the screen of the function on one display based on the issue of the screen transition request. As a result, the inconsistency due to changing, by a user, the operating state of the function by using the one display is avoided.

Assume that the upper display 12a is displaying a screen associated with a certain function and the lower display 12b is also displaying a screen associated with the same function (for example, a setting screen) and that the user changes the operating state of the function by utilizing the display of the lower display 12b. In this case, the displayed content of the upper display 12a may be inconsistent with the actual state of the function concerned, in contrast with the present embodiment.

For example, assume that the upper display 12a is displaying the screen for inputting the calling destination telephone number of the hands-free telephone call and the lower display 12b is displaying the outgoing and incoming call history screen of the hands-free telephone call and that the user selects one call partner on the outgoing and incoming call history screen as a calling destination by utilizing the lower display 12b. In this case, an outgoing call to the call partner will be transmitted and a telephone call with the call partner will be performed; accordingly, the screen for inputting the calling destination telephone number of the upper display 12a will become meaningless.

As another example, assume that the upper display 12a is displaying the vehicle setting screen of the basic group and the lower display 12b is also displaying the vehicle setting screen of the basic group, and that the user changes the setup to the lower display 12b using the lower-display touch panel 134. In this case, the setting contents displayed on the upper display 12a becomes different from the setting contents displayed on the lower display 12b. Accordingly, the occupant will experience the feeling of discomfort.

The examples of FIG. 5 and FIG. 7 illustrate the cases where the screen transition request is such that the screen that belongs to the same group as the screen displayed on one display and that has the same screen ID as the screen displayed on the one display be displayed on the other display.

Specifically, in the example illustrated in FIG. 5, the same menu list screen is displayed on both of the upper display 12a and the lower display 12b by the transition 52, and in the example illustrated in FIG. 7, the same menu list screen is displayed on both of the upper display 12a and the lower display 12b by the transition 57.

However, for example, when the screen transition request is such that the screen that belongs to the same group as the screen displayed on one display and that has a different screen ID from the screen displayed on the one display concerned be displayed on the other display, the subsequent operation is the same. That is, also in that case, the notice of collision occurs subsequently and the screen of the earlier-displaying display makes a transition, and consequently, the screens displayed on the upper display 12a and the lower display 12b belong to different groups.

In the present embodiment, the control circuit 17 functions as an example of the determination means and the determination unit by executing Step 320, and functions as an example of the display control means and the display control unit by executing Steps 250 and 260.

Other Embodiments

The embodiment is not restricted to the above-described embodiment and can be modified on a case-by-case basis. In the above-described embodiment, it is to be understood that a component constituting the embodiment is not necessarily indispensable, otherwise specified explicitly or otherwise considered clearly indispensable in its principle. When numerical limitations, such as the total number, the numerical value, the amount, the range, etc. of components of the embodiment are referred to in the embodiment, it is not always restricted to the specific ones, otherwise specified explicitly or otherwise considered clearly indispensable clearly in its principle. In the above-described embodiment, when the form, the positional relationship, etc. of the components are referred to, these are not limiting, otherwise specified explicitly or otherwise considered clearly indispensable in its principle. The following modification examples of the above-described embodiment are also embodiments. The following modified examples can be selectively applied to or not to the above-described embodiment independently of each other. That is, arbitrary combinations out of the following modified examples can be applied to the above-described embodiment.

(First Modification)

In the above-described embodiment, the control circuit 17 causes the displayed content of the earlier-displaying display to make a transition, when the notice of collision occurs. Alternatively, the control circuit 17 may cause the displayed content of the other display than the earlier-displaying display to make a transition.

(Second Modification)

In the above-described embodiment, the upper display 12a can also display the screen belonging to the basic group. However, it may not necessarily be configured in this way, and the upper display 12a may be unable to display the screen belonging to the basic group, with the same scheme as the scheme with which the lower display 12b cannot display the screen belonging to the map group.

(Third Modification)

The processing of Step 320 of FIG. 4 may be placed after the Yes/No branch of Step 330. In this case, the control circuit 17 executes Step 330 immediately after Step 310 of FIG. 4, and determines at Step 330 whether the screen transition request to display the screen belonging to the same group on the upper display 12a and the lower display 12b is issued. When the screen transition request is issued, the control circuit 17 executes Step 320 and advances to Step 340. When no screen transition request is issued, Step 320 is executed. In this way, the execution timing of Steps 320 and 330 may be shifted back and force.

What is claimed is:

1. A display controller for controlling a first display and a second display, the display controller comprising:
a determination unit that
from a memory, reads screen grouping data classifying a plurality of display screens into groups on a function basis, each group having a plurality of display screens associated with a same function, and the groups including a basic function group, a map display function group, a hands-free function group, and a navigation function group, and
based on the screen grouping data, determines whether a specific screen transition request is issued, wherein the specific screen transition request is a request that a screen belonging to the same group and being associated with the same function as a screen currently displayed on one display of the first and the second displays be displayed on the other display of the first and the second displays; and
a display control unit that
based on determining that the specific screen transition request is issued, displays on the one display of the first and second displays a screen other than the screen belonging to the same group such that the display screens from the same group and associated with the same function are prevented from being displayed on both first and second displays for more than a predetermined time period; and
displays the screen other than the screen belonging to the same group within the predetermined time period from the specific screen transition request being issued such that the screen belonging to the same group and being associated with the same function as the screen currently displayed is displayed for less than the predetermined time period.

2. The display controller according to claim 1, wherein the display control unit displays a statically predetermined screen on the one display as the screen other than the screen belonging to the same group, based on determining by the determination unit that the specific screen transition request is issued.

3. The display controller according to claim 2, wherein the statically predetermined screen is prohibited from being displayed on the other display of the first and second displays.

4. The display controller according to claim 1, wherein the display control unit displays the screen other than the screen belonging to the same group on the one display that has previously displayed the screen belonging to the same group, based on determining by the determination unit that the specific screen transition request is issued.

5. The display controller according to claim 1, wherein the display control unit controls the first and second displays such that a screen associated with the map display function is prevented from being displayed on both the first and second displays.

6. The display controller according to claim 1, wherein the predetermined time period is one second.

7. A non-transitory storage medium storing a program for a display controller for controlling a first display and a second display, the program causing the display controller to:

read, from a memory, screen grouping data classifying a plurality of display screens into groups on a function basis, the groups including a basic function croup, a map display function group, a hands-free function group, and a navigation function group;

determine, based on the screen grouping data, whether a specific screen transition request is issued, wherein the specific screen transition request is a request that a screen belonging to the same group as a screen displayed on one display of the first and second displays be displayed on the other display of the first and second displays;

display on the one display of the first and second displays the screen belonging to the same group for less than a predetermined time period from when the specific screen transition request is issued; and display on the one display of the first and second displays a screen other than the screen belonging to the same group within the predetermined time period from when the screen transition request is issued based on determining that the specific screen transition request is issued.

8. The non-transitory storage medium according to claim 7, wherein the predetermined time period is one second.

9. A system comprising:

a control circuit, having a processor and memory, configured to: (i) control a first display and a second display; (ii) read, from a memory, a screen grouping data classifying a plurality of display screens into groups on a function basis, each group having a plurality of display screens associated with a same function, and the groups including a basic function group, a map display function group, a hands-free function croup, and a navigation function group; (iii) determine, based on the screen grouping data, whether a specific screen transition request is issued, the specific screen transition request being a request that a screen belonging to the same group and being associated with the same function as a screen currently displayed on one display of the first and the second displays be displayed on the other display of the first and the second displays; and (iv) display on the one display of the first and second displays a screen other than the screen belonging to the same group within a predetermined time period from when the specific screen transition request is issued such that the display screens associated with the same function are prevented from being displayed on both first and second displays for more than a predetermined time period based on determining that the specific screen transition request is issued.

10. The system according to claim 9, wherein the control circuit is further configured to display a statically predetermined screen on the one display, based on determining that the specific screen transition request is issued.

11. The system according to claim 10, wherein the statically predetermined screen is prohibited from being displayed on the other display of the first and second displays.

12. The system according to claim 9, wherein the control circuit is further configured to display the screen other than the screen belonging to the same group on the one display that has previously displayed the screen belonging to the same group, based on determining that the specific screen transition request is issued.

13. The system according to claim 9, wherein the control circuit is further configured to prevent display of a screen associated with the map display function on both the first and second displays.

14. The system according to claim 9, wherein the predetermined time period is one second.

* * * * *